United States Patent [19]
Imai et al.

[11] Patent Number: 5,337,970
[45] Date of Patent: Aug. 16, 1994

[54] PRELOADER FOR A WEBBING RETRACTOR

[75] Inventors: Keisuke Imai; Toshimasa Yamamoto; Akio Numazawa; Hitoshi Iwata; Yasutaka Watanabe, all of Aichi, Japan

[73] Assignee: Kabushiki Kaisha Tokai-Rika-Denki-Seisakusho, Aichi, Japan

[21] Appl. No.: 740,944

[22] Filed: Aug. 6, 1991

[30] Foreign Application Priority Data

Aug. 8, 1990 [JP] Japan .................. 2-209491

[51] Int. Cl.⁵ ............................ B60R 22/46
[52] U.S. Cl. ........................ 242/374; 280/806
[58] Field of Search ............ 242/107, 107.4 R; 280/806, 807; 297/478

[56] References Cited

U.S. PATENT DOCUMENTS 4,423,846  1/1984  Fohl ..................... 242/107

FOREIGN PATENT DOCUMENTS

| | | |
|---|---|---|
| 321960 | 6/1989 | European Pat. Off. . |
| 361075 | 4/1990 | European Pat. Off. . |
| 8400155 | 9/1985 | Fed. Rep. of Germany . |
| 3400177 | 8/1989 | Fed. Rep. of Germany . |
| 210743 | 8/1982 | Japan . |
| 59-95068 | 5/1984 | Japan . |
| 325052 | 2/1991 | Japan . |
| 3-92453 | 4/1991 | Japan .................. 242/107.4 R |

*Primary Examiner*—Daniel P. Stodola
*Assistant Examiner*—John Q. Nguyen
*Attorney, Agent, or Firm*—Sixbey Friedman Leedom & Ferguson

[57] ABSTRACT

A preloader for use in a webbing retractor for retracting an occupant-restraining webbing forcibly onto a takeup shaft at the time of a sudden deceleration of a vehicle. The preloader includes a angular shaft rotating integrally with the takeup shaft; a deformable member disposed around the angular column shaft; and a wire connected to the deformable member and wound therearound. The wire is tightly wound around the deformable member at the time of a sudden deceleration of the vehicle, thereby causing the deformable member to undergo deformation and engage with the angular shaft. The angular shaft is hence rotated integrally with the deformable member so as to positively rotate the takeup shaft in a taking-up direction.

12 Claims, 11 Drawing Sheets

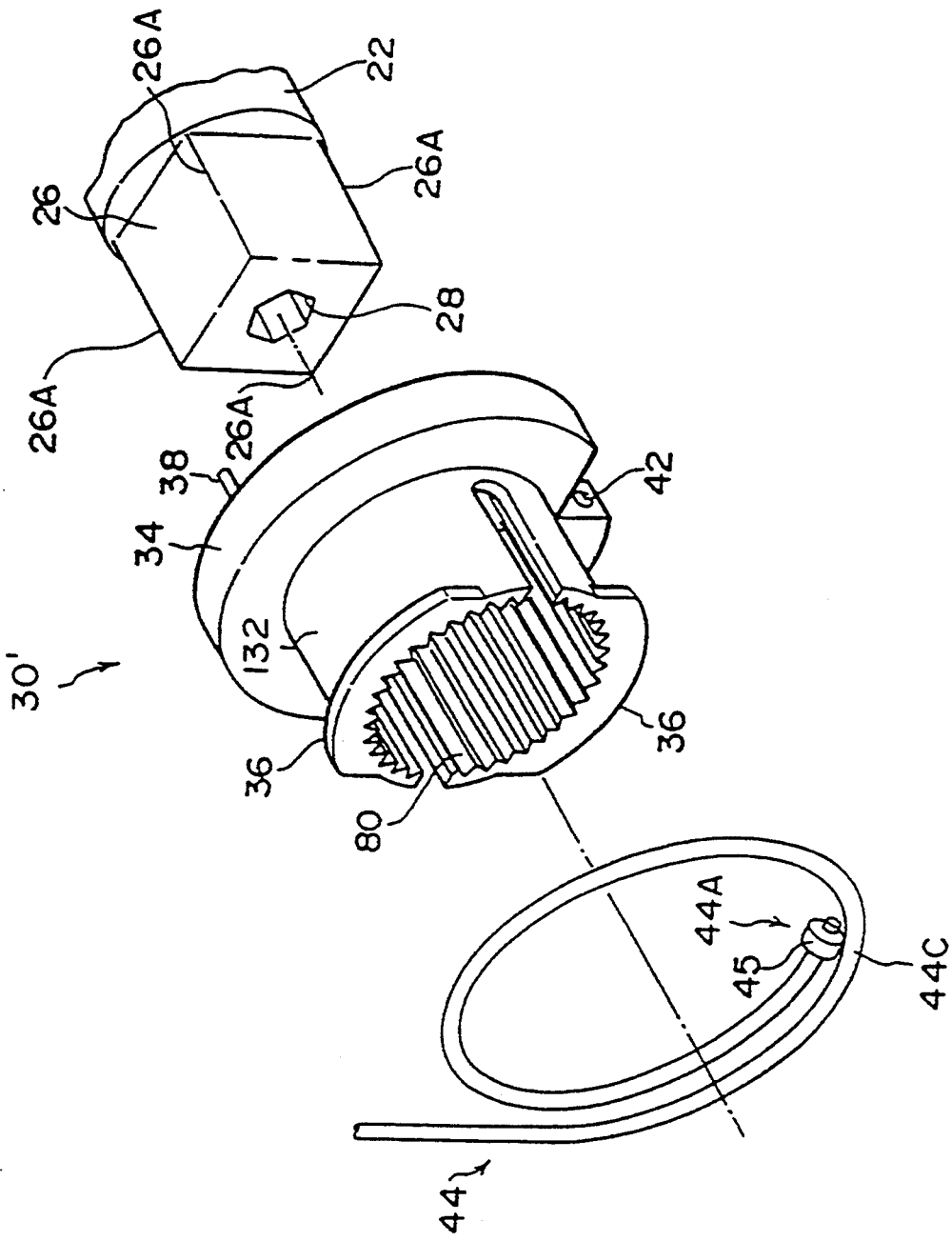

PRELOADER FOR A WEBBING RETRACTOR

BACKGROUND OF THE INVENTION

1. Field of the Invention

The present invention relates to a preloader for use in a webbing retractor and adapted to allow a webbing to be applied to a vehicle occupant with appropriate tightness at the time of a sudden deceleration of a vehicle.

2. Description of the Related Art

A seat belt apparatus is adapted to restrain a vehicle occupant with appropriate tightness by means of a webbing at the time of a sudden deceleration of a vehicle. If there is a large clearance between the webbing and the occupant, however, the seat belt apparatus cannot display a restraining performance sufficiently. For this reason, preloaders for allowing the webbing to be applied closely around the occupant by forcibly pulling the webbing in the direction of retraction at the time of a sudden deceleration of the vehicle, as well as webbing retractors equipped with the preloader, have been proposed.

The preloader of this type is so arranged as to allow the webbing to be retracted and paid out freely without hampering the rotation of a takeup shaft, during the normal running of the vehicle. At the time of a sudden deceleration of the vehicle, however, the preloader must instantaneously rotate the takeup shaft in a taking-up direction so as to retract the webbing immediately. For this reason, the preloader of this type is provided with a clutch mechanism, so that a clutch is engaged only at the time of a sudden deceleration of the vehicle, thereby allowing the takeup shaft to rotate in the taking-up direction.

One known clutch mechanism is arranged such that a wire is wound with play around a rotating drum disposed integrally with the takeup shaft, and as the wire is forcibly pulled, the rotating drum is tightened by the winding force, and the rotating drum is rotated by a frictional force occurring during the tight winding so as to transmit the retracting torque of the preloader to the takeup shaft (Japanese Patent Application Laid-Open No. 59-95068 etc.).

With the clutch mechanism of this type, however, there is a drawback in that the wire can loosen and slip over the peripheral surface of the rotating drum, since the connection between the wire and the rotating drum utilizes the frictional force.

SUMMARY OF THE INVENTION

Accordingly, it is an object of the present invention to provide a preloader capable of positively rotating a rotating drum with a wire wound therearound at the time of a sudden deceleration of a vehicle, and of transmitting the torque of the rotating drum positively to a takeup shaft so positively takeup a webbing, thereby overcoming the above-described drawback of the conventional art.

To this end, in accordance with the present invention, there is provided a preloader for use in a webbing retractor for retracting an occupant-restraining webbing forcibly onto a takeup shaft at the time of a sudden deceleration of a vehicle, comprising: a member to be engaged which rotates integrally with the takeup shaft; an engaging member disposed around the member to be engaged in spaced-apart relation therewith, and including a deformable portion; and actuating means connected to the engaging member and wound around the engaging member, the actuating means being adapted to be tightly wound around the engaging member at the time of the sudden deceleration of the vehicle so as to cause the engaging member to undergo deformation, thereby allowing the engaging member to engage with the member to be engaged and rotate the member to be engaged together with the engaging member, so as to rotate the takeup shaft in a taking-up direction.

In accordance with the present invention arranged as described above, since the rotating drum, or the retaining member such as a cylinder, is not deformed during the normal state of the vehicle, the rotating drum is not engaged with the member to be engaged, and the takeup shaft coupled with the member to be engaged is rotatable. For this reason, the occupant-restraining webbing can be freely retracted or paid out.

At the time of a sudden deceleration of the vehicle, however, the actuating means is tightly wound around the rotating drum, thereby causing the rotating drum to undergo deformation and engage with the member to be engaged. Subsequently, the rotating drum, together with the member to be engaged, is rotated in the taking-up direction of the takeup shaft. Accordingly, the takeup shaft coupled with the member to be engaged is rotated in the taking-up direction, thereby allowing the occupant-restraining webbing to be retracted.

The above and other objects, features and advantages of the present invention will become more apparent from the following description of the invention when read in conjunction with the accompanying drawings.

BRIEF DESCRIPTION OF THE DRAWINGS

FIG. 6 is a perspective view of a rotating drum in accordance with a third embodiment of the present invention;

DESCRIPTION OF THE PREFERRED EMBODIMENTS

Figure 1:
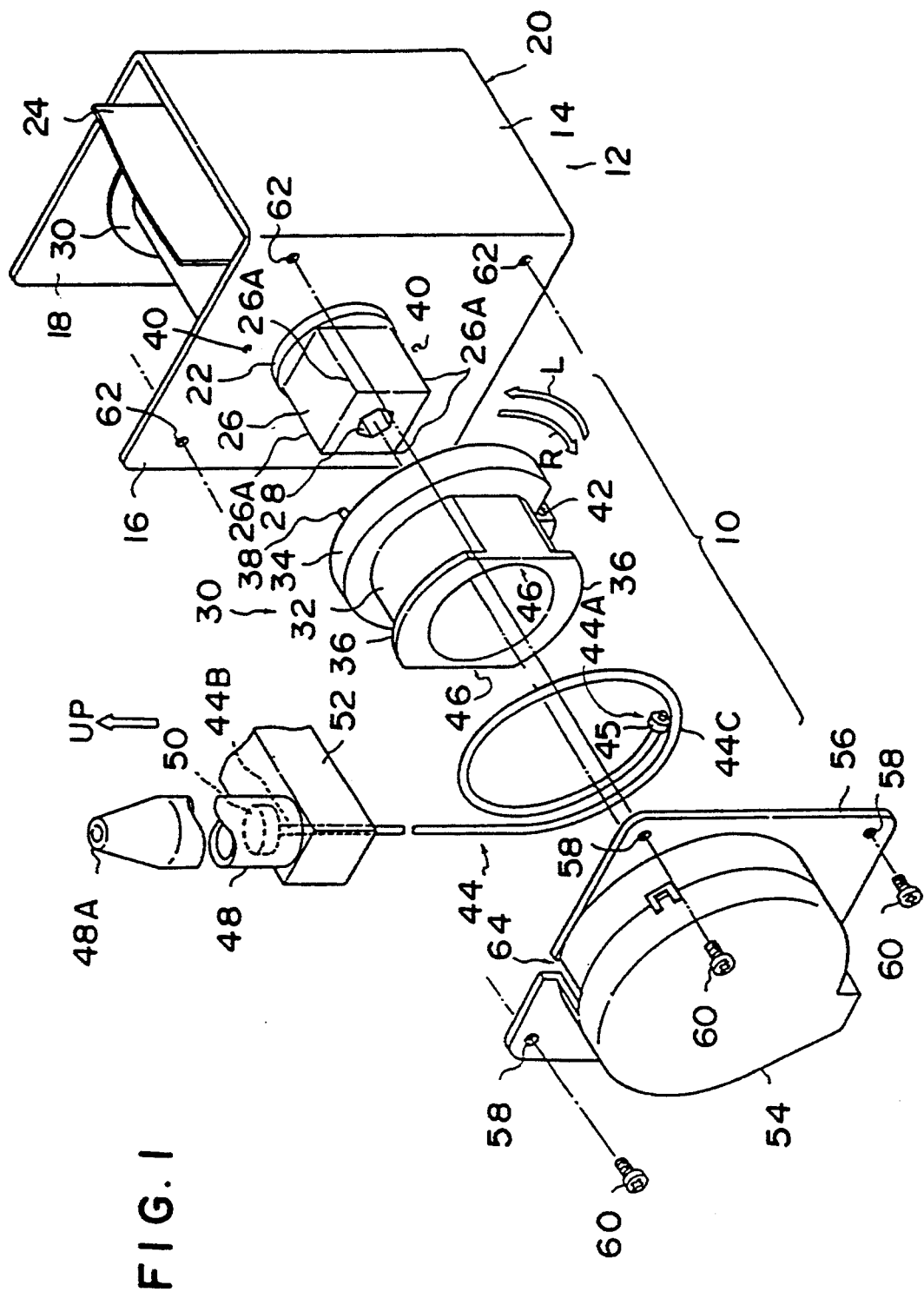
FIG. 1 is an exploded perspective view of a preloader in accordance with a first embodiment of the present invention as well as a webbing retractor.
Figure 2:
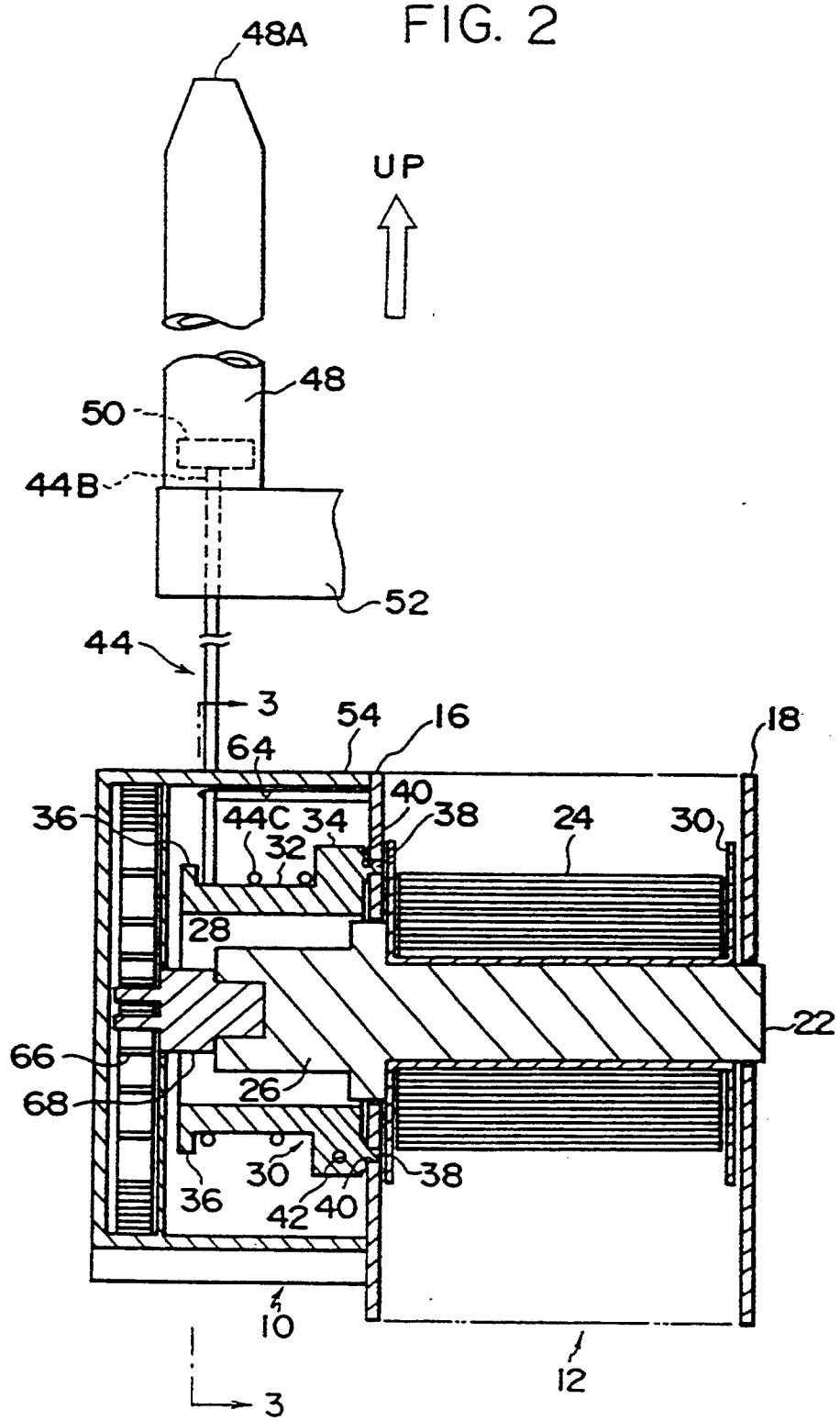
FIG. 2 is a partly cross-sectional view of the preloader and the webbing retractor shown in FIG. 1.

FIG. 1 shows a perspective view of a preloader in accordance with the present invention as well as a webbing retractor 12 to which the preloader is applied. FIG. 2 shows a partly cross-sectional view of the preloader 10 and the webbing retractor 12 shown in FIG. 1.

The preloader 10 has a frame 20 which is constituted by a plate 14 secured to an unillustrated center pillar of a vehicle and a pair of tabular side plates 16, 18 extending orthogonally from opposite sides of the plate 14, in parallel with each other.

The side plates 16, 18 rotatably support a takeup shaft 22; one end of a webbing 24 serving as an occupant-restraining webbing is retained at the takeup shaft 22, and the webbing 24 is wound around the takeup shaft 22 in the form of a roll.

One end portion of the takeup shaft 22 extends outwardly by a predetermined length, and an angular shaft 26 is formed integrally thereon. The cross section of the angular shaft 26 orthogonal to the axial direction thereof is square, and a coupling hole 28 whose cross section orthogonal to the axial direction is hexagonal is formed in an axial end portion of the angular shaft 26.

A rotating drum, i.e., a cylinder, 30 is disposed radially outwardly of the angular shaft 26. The rotating drum 30 is arranged such that a cylindrical or tubular portion 32 formed into a hollow, substantially cylindrical configuration is formed integrally with an annular support 34 having a larger diameter than the cylindrical portion 32, the annular support 34 being disposed in such a manner as to abut against the side plate 16 of the webbing retractor 12. The rotating drum 30 has a flange 36 extending radially outwardly from an end thereof located away from the webbing retractor 12.

Figure 3:
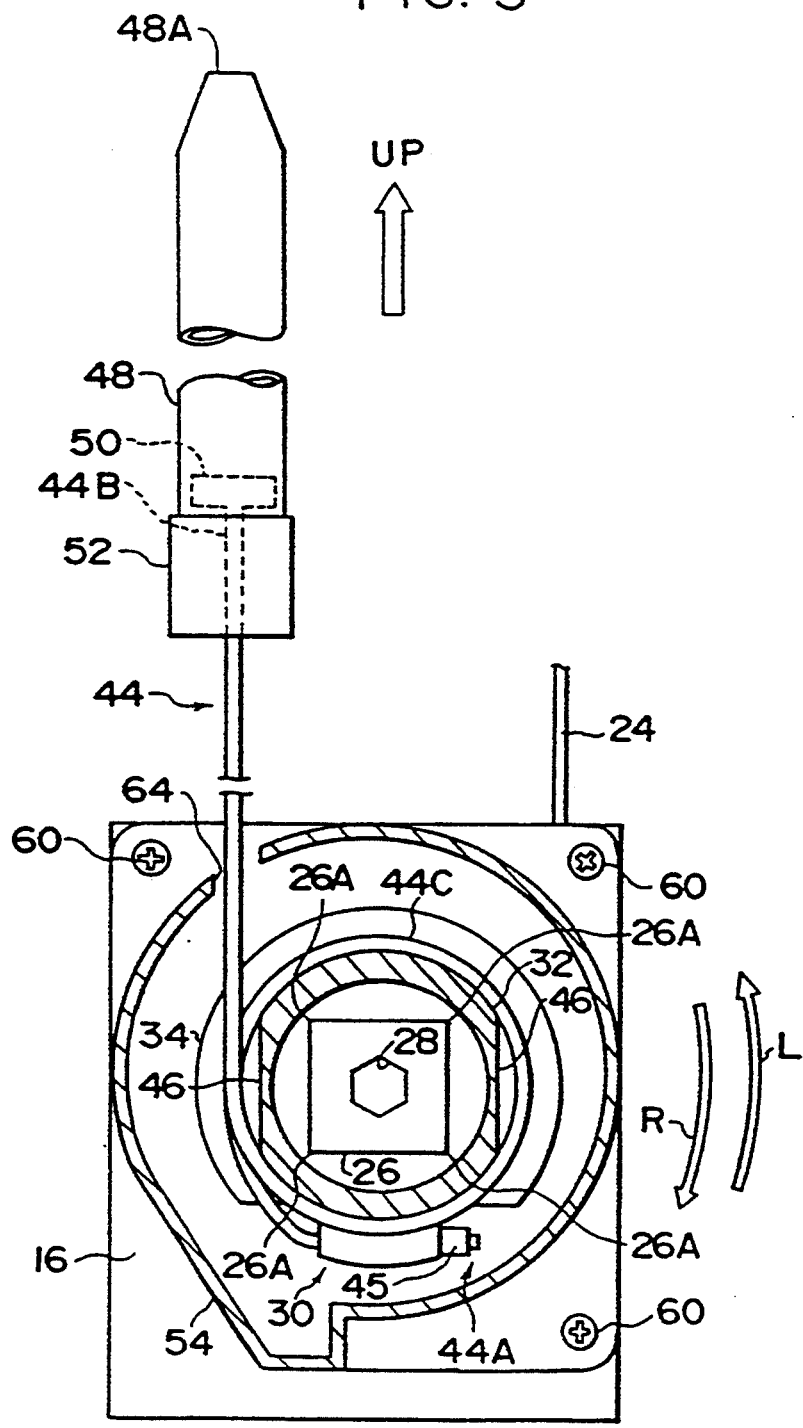
FIG. 3 is a cross-sectional view of the preloader taken along line 3—3 of FIG. 2.

As shown in FIG. 3, the inside diameter of the cylindrical portion 32 is formed to be slightly larger than the outside diameter of the angular shaft 26, so that an inner peripheral surface of the cylindrical portion 32 will not abut against angular portions 26A of the angular shaft 26, thereby allowing the angular shaft 26 to rotate freely.

A pair of shear pins 38 are disposed on a side surface of the support 34 on the side plate 16 side, one in the vicinity of an upper portion thereof and the other in the vicinity of a lower portion thereof. These shear pins 38 are each fitted in a pin hole 40 formed in the side plate 16, with the result that the rotating drum 30 is held in position on the side plate 16. In addition, these shear pins 38 are adapted to be sheared when a predetermined shearing force acts thereon.

A lower portion of the support 34 is partly notched, and a retaining hole 42 is bored therein in the circumferential direction of the support 34. An end portion 44A of a wire 44 is inserted in this retaining hole 42 and is retained by a piece 45. Furthermore, an intermediate portion 44C of the wire 44 is wound around the outer peripheral surface of the cylindrical portion 32 in a taking-up direction of the takeup shaft 22 (in the direction of arrow R in FIG. 1) with the retaining hole 42 as a starting point. Consequently, when the other end portion 44B of the wire 44 is pulled radially outwardly of the cylindrical portion 32, the intermediate portion 44C of the wire 44 is tightened onto the cylindrical portion 32 by the winding thereof, so that a torque acting in the taking-up direction of the takeup shaft 22 is produced in the cylindrical portion 32.

The rotating drum 30 is formed of a flexible member, and a pair of thin-walled portions 46 formed by cutting off portions of the outer periphery of the rotating drum 30 in a tangential direction are provided in the rotating drum 30 at symmetrical positions with respect to the center of the cylindrical portion 32. Consequently, the rotating drum 30 is liable to undergo deformation. A deforming force for deforming the thin-walled portions is set to be smaller than a shearing force for shearing the shear pins 38. Hence, when the intermediate portion 44C of the wire 44 is wound tightly around the cylindrical portion 32, the thin-walled portions 46 are first collapsed by the tight winding force, thereby allowing the cylindrical portion 32 to be deformed toward the axis thereof.

Meanwhile, the other end portion 44B of the wire 44 is connected to a piston 50 of a cylinder 48 constituting an actuating means. A gas generator 52 is fixed to the cylinder 48. An unillustrated gas generating agent is accommodated in the gas generator 52, and when an unillustrated acceleration sensor has detected a state of a sudden deceleration of the vehicle, a large amount of gas is generated and jetted into the cylinder 48. As a result, the piston 50 is pressed by the jetting gas and moves toward a distal end 48A of the cylinder 48, thereby pulling the other end portion 44B of the wire 44.

The rotating drum 30 is covered with a hollow, substantially cylindrical cover 54 whose end located away from the webbing retractor 12 is closed. A mounting flange 56 is formed at an end of the cover 54 on the webbing retractor 12 wide, and screws 60 inserted in round holes 58 in the mounting flange 56 are threadedly inserted into threaded holes in the side plate 16, so as to secure the cover 54 to the side plate 16. A wire hole 64 is formed in an upper portion of the cover 54 on the webbing retractor 12 side, and the intermediate portion 44C of the wire 44 is inserted therethrough.

As shown in FIG. 2, a spiral spring 66 is accommodated in the cover 54, an outer end of the spiral spring 66 being retained by the cover, and an inner end thereof being retained by a coupling shaft 68. An end portion of the coupling shaft 68 on the webbing retractor 12 side is formed into a hexagonal configuration in correspondence with the coupling hole 28 in the angular 26, and is inserted in and coupled with the coupling hole. Accordingly, the urging force of the spiral spring 66 is imparted to the takeup shaft 22 via the coupling shaft 68, thereby urging the takeup shaft 22 in the taking-up direction (in the direction of arrow R in FIG. 1) so as to takeup the webbing 24 in the form of a roll. Meanwhile, the webbing 24 is adapted to be pulled out as the takeup shaft 22 is rotated in a pulling-out direction against the urging force of the spiral spring 66. Furthermore, an unillustrated lock mechanism which is actuated by an unillustrated acceleration sensor to instantaneously prevent the rotation of the takeup shaft 22 in the pulling-out direction is provided for the webbing retractor 12.

In a case where the webbing retractor 12 on which the preloader 10 having the above-described arrangement is used for a continuous-webbing type three-point seat belt apparatus, the webbing 24 paid out of the takeup shaft 22 has the other end portion retained by a chassis via an unillustrated anchor member and the intermediate portion folded back by an unillustrated slip joint retained by the chassis. Furthermore, an unillustrated tongue plate is fixed to an intermediate portion of the webbing 24 between the anchor member and the slip joint in such a manner as to be longitudinally slidable.

When the occupant seated in the seat pulls the webbing 24 out of the takeup shaft 22 and engages the same with a buckle device disposed on the chassis, the occupant assumes a state in which the webbing of the three-point seat belt is applied to him or her.

A description will now be given of the operation of this embodiment.

During the normal state of the vehicle, the inner peripheral surface of the cylindrical portion 32 is spaced apart from the angular portions 26A of the angular shaft 26, so that the takeup shaft 22 is capable of rotating freely in both the taking-up and pulling-out directions of the webbing 24. Accordingly, since the webbing 24 is retracted or paid out freely with respect to the takeup shaft 22 by following a change in the occupant's posture, the webbing 24 does not restrict the occupant in the normal state.

Figure 4:
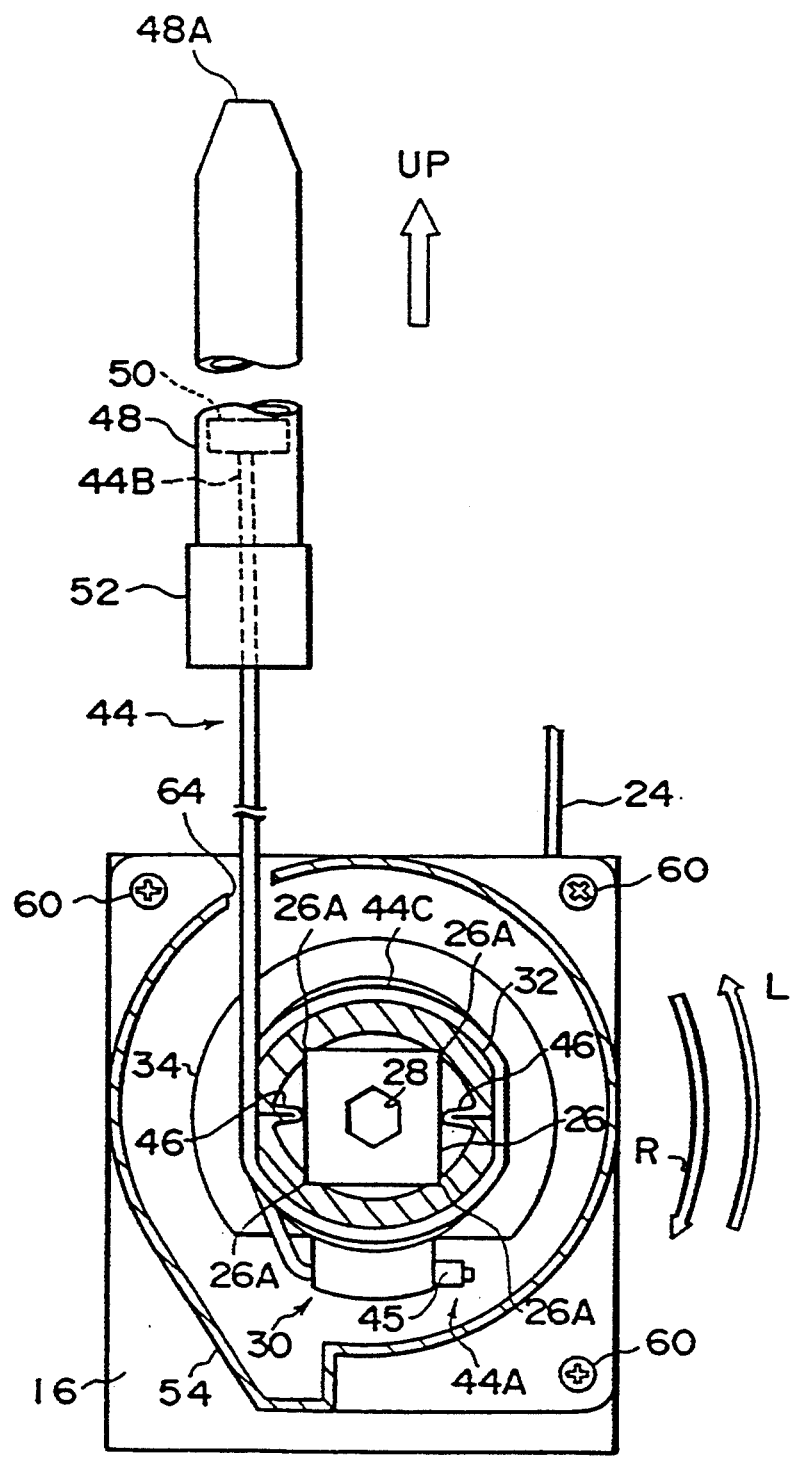
FIG. 4 is a cross-sectional view illustrating a state in which a wire of the preloader shown in FIG. 2 is tightened onto a rotating drum, causing a cylindrical portion to undergo deformation and bite an angular shaft.

However, at the time of a sudden deceleration of the vehicle (in the event that an acceleration of 10G or thereabouts has acted), the acceleration sensor detects the acceleration, and actuates the gas generator 52, thereby causing a large amount of gas to be generated instantaneously. The gas thus produced is jetted into the cylinder 48, and the piston 50 receives the gas pressure and moves suddenly toward the distal end portion 48A of the cylinder 48. The piston 50 pulls the other end portion 44B of the wire 44, so that the intermediate portion 44C of the wire 44 is tightly wound around the cylindrical portion 32, as shown in FIG. 4. At this juncture, since the deforming force for deforming the thin-walled portions 46 is set to be smaller than the shearing force for shearing the shear pins 38, the thin-walled portions 46 of the cylindrical portion 32 are first collapsed by the tight winding force of the wire 44, and the cylindrical portion 32 therefore undergoes deformation toward its axis. As a result, the inner peripheral surface of the cylindrical portion 32 bites the angular portions 26A of the angular shaft 26, so that the rotating drum 30 and the angular shaft 26 are made integral. Then, the shear pins 38 are sheared by the torque of the rotating drum 30, and the rotating drum 30 and the angular shaft 26 are rotated in an integral state in the taking-up direction (in the direction of arrow R in FIG. 4). As a result, the takeup shaft 22 rotates suddenly in the taking-up direction so as to take up the webbing 24, thereby allowing the webbing 24 to be applied closely around the occupant.

That is to say, during the initial phase of the tight winding, slippage of the wire 44 on the rotating drum 30 can be prevented owing to the presence of the shear pins 38, so that positive winding up of the wire 44 can be accomplished. Thereafter, since the torque of the rotating drum 30 causes the shear pins 38 to be sheared, the torque of the rotating drum 30 is positively transmitted to the angular shaft 26. Namely, the shear pins 38 are designed to have such strength as will be sheared by the torque of the rotating drum 30 after the wire 44 causes the rotating drum 30 to undergo deformation.

Concurrently, the webbing 24 tends to be pulled out of the webbing retractor 12 owing to the inertial movement of the occupant, but the unillustrated lock mechanism for instantaneously prevent the rotation of the takeup shaft 22 in the pulling-out direction is actuated, the takeup shaft 22 is prevented from rotating in the pulling-out direction. Consequently, the occupant is positively restrained with the webbing 24 applied closely around him or her.

Thus, the cylindrical portion 32 of the rotating drum 30 can be engaged positively with the angular shaft 26 by causing the cylindrical portion 32 to undergo deformation by the tight winding force of the wire 44, with the result that the torque of the rotating drum 30 is positively transmitted to the takeup shaft 22. Accordingly, the webbing can be taken up positively, there by making it possible to display an appropriate preloading function.

In addition, in this embodiment, since the clutch mechanism is constituted by a simple arrangement in which the rotating drum is made to correspond to the angular shaft 26, the number of components used can be reduced, thereby facilitating the assembling operation and reducing the cost.

Figure 5A:
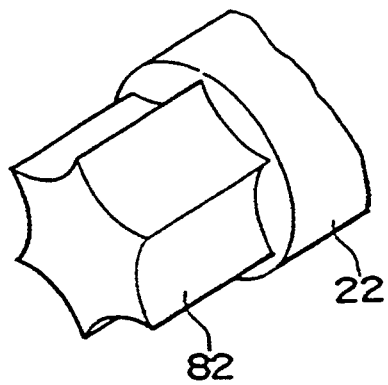
FIGS. 5A to 5C are perspective views of engaged shafts in accordance with a second embodiment of the present invention.
Figure 5B:
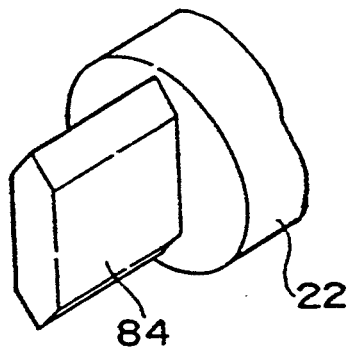
Figure 5C:
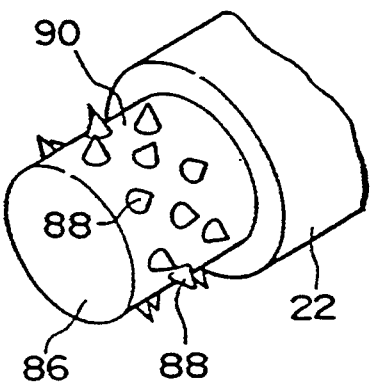

Although in this embodiment, as a member to be engaged, the angular shaft 26 whose cross section orthogonal to the axial direction is square is disposed at an end portion of the takeup shaft 22, the present invention is not restricted to the same. For instance, as a second embodiment of the present invention, the member to be engaged may be arranged as shown in FIG. 5A in which an shaft to be engaged 82 whose cross section orthogonal to the axial direction is formed into a substantially hexagonal configuration with apexes formed into acute angles is provided. Alternatively, the member to be engaged may be arranged as shown in FIG. 5B in which a shaft to be engaged 84 whose cross section orthogonal to the axial direction is formed into a rectangular configuration with its longitudinal opposite ends are cut into acute angles is provided. Furthermore, the member to be engaged may be arranged as shown in FIG. 5C in which a shaft to be engaged 90 is provided in which a plurality of conical engaging projections 88 each having an acute apex are formed on a radially outward peripheral surface of a cylindrical member 86. Thus various projecting surfaces may be formed on the member to be engaged. Since these shafts to be engaged 82, 84, 90 are provided with more acutely projecting outer peripheral portions as compared with the angular portions 26A of the angular column shaft 26, the shafts to be engaged with 82, 84, 90 can catch and bite the inner peripheral surface of the cylindrical portion 32 more easily.

Furthermore, as a third embodiment of the present invention, a plurality of grooves 80 may be formed in the inner peripheral surface of the cylindrical portion 132 of drum 30' along the axial direction thereof, a shown in FIG. 6. In this case, the inner peripheral surface of the cylindrical portion 132 can catch and bite the angular portions 26A of the angular shaft 26 more easily.

Figure 7A:
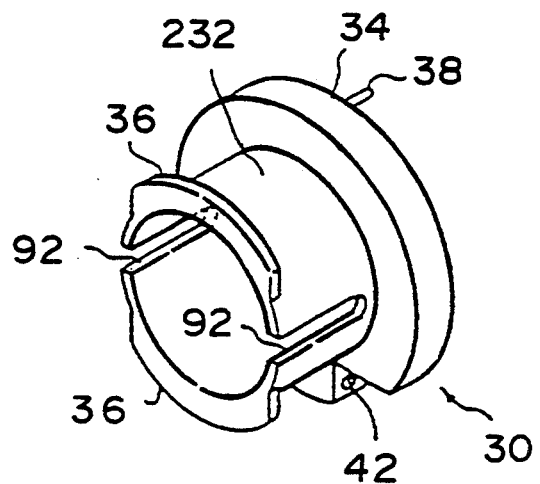
FIGS. 7A to 7D are perspective views of rotating drums in accordance with a fourth embodiment of the present invention.
Figure 7B:
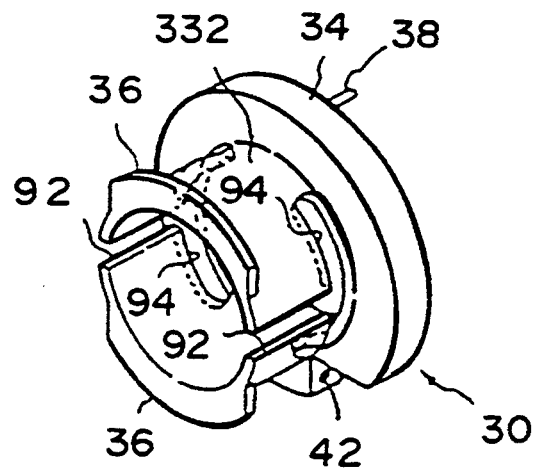
Figure 7C:
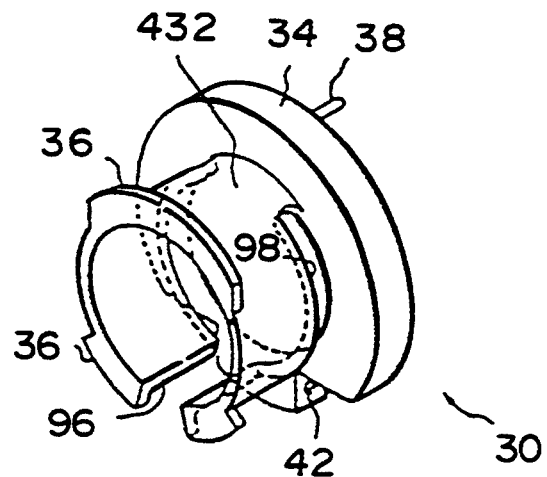
Figure 7D:
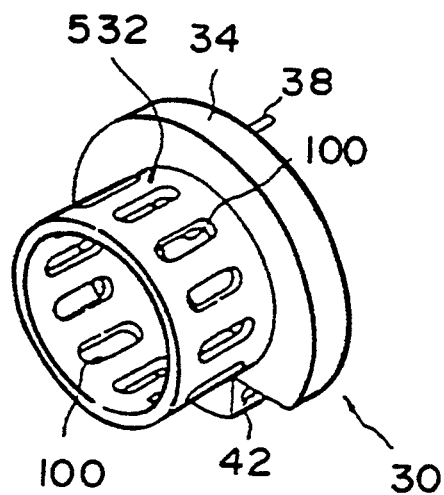

Although in the first and second embodiments the rotating drums 30 and 30' are provided with the thin-walled portions 46 on the cylindrical portions 32 and 132 so as to be made easily deformable, the present invention is not restricted to the same, and an arrangement may be provided as shown in FIGS. 7A to 7D by way of a fourth embodiment in which slits are formed in the cylindrical portion 232 so as to make the rotating drum 30 easily deformable. That is, as shown in FIG. 7A, a pair of slits 92 may be formed in the cylindrical portion 232 along the axial direction thereof in such a manner as to oppose each other. Alternatively, as shown in FIG. 7B, after the pair of slits 92 are formed in the cylindrical portion along the axial direction thereof in such a manner as to oppose each other, a pair of slits 94 may be further formed in the cylindrical portion 332 in face-to-face relation in such a manner as to extend circumferentially from a longitudinal end of each slit 92. In addition, as shown in FIG. 7C, after one slit 96 is formed in the cylindrical portion 432 along the axial direction thereof, a pair of slits 98 may be further formed in the cylindrical portion 432, each slit 98 extending from a longitudinal end of the slit 96 in a mutually opposite circumferential direction. Furthermore, as shown in FIG. 7D, a plurality of slits 100 formed in the cylindrical portion 532 in such a manner as to extend along the axial direction thereof may be arranged in the circumferential direction so as to provide portions having a low strength. In these cases as well, the cylindrical portion 532 is capable of undergoing deformation toward its axis, so that the inner peripheral surface of the cylindrical portion 532 can be made to bite the angular portions 26A of the angular shaft 26.

Figure 8A:
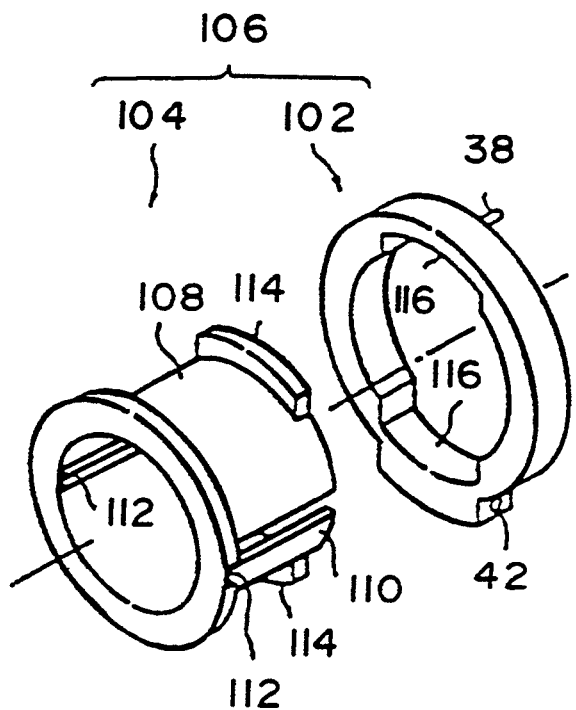
FIGS. 8A to 8E are perspective views of rotating drums in accordance with a fifth embodiment of the present invention.
Figure 8B:
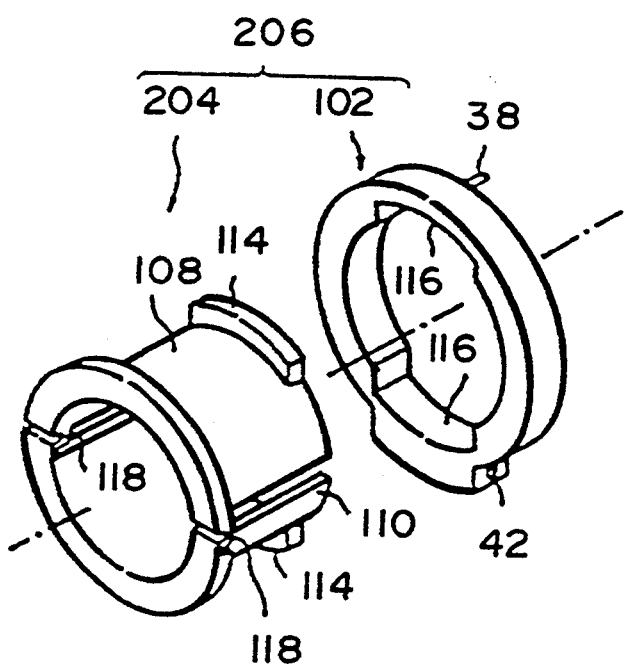

In addition, although in the foregoing embodiments the rotating drum 30 formed integrally by the cylindrical portions 32, 232, 332, 432, 532, respectively, and the support 34 is used in the arrangement, the present invention is not restricted to the same. For instance, an arrangement may be provided as shown in FIGS. 8A–8E by way of a fifth embodiment in which a rotating drum 106 is used which is split into a support 102 formed into an annular configuration and a cylindrical portion 104 formed into a hollow cylindrical configuration. That is, as shown in FIG. 8A, the cylindrical portion 104 may be split into an upper cylindrical portion 108 and a lower cylindrical portion 110 which are connected together at thin-walled modified portions 112 formed at ends thereof remote from the support 102 side. In addition, a pair of upper and lower projecting portions 114 may be formed at end portions of the upper and lower cylindrical portions 108, 110 on the support 102 side. These projecting portions 114 are respectively inserted in and connected to a pair of upper and lower recessed portions 116 formed in the support 102, whereby the support 102 and the cylindrical portion 104 are adapted to be rotated integrally. In this case, since the upper cylindrical portion 108 and the lower cylindrical portion 110 are connected together at the thin-walled modified portions 112, the cylindrical portion 104 can be deformed by a weak tightly winding force as compared with the cylindrical portion 32. In addition, as shown in FIG. 8B, an arrangement may be provided such that the upper cylindrical portion 108 and the lower cylindrical portion 110 are connected together by a pair of thin-walled modified portions 118 each formed into the configuration of a crank. In this case as well, the cylindrical portion 204 of rotating drum 206 can be deformed by a weak tightly winding force as compared with the cylindrical portion 32.

Figure 8C:
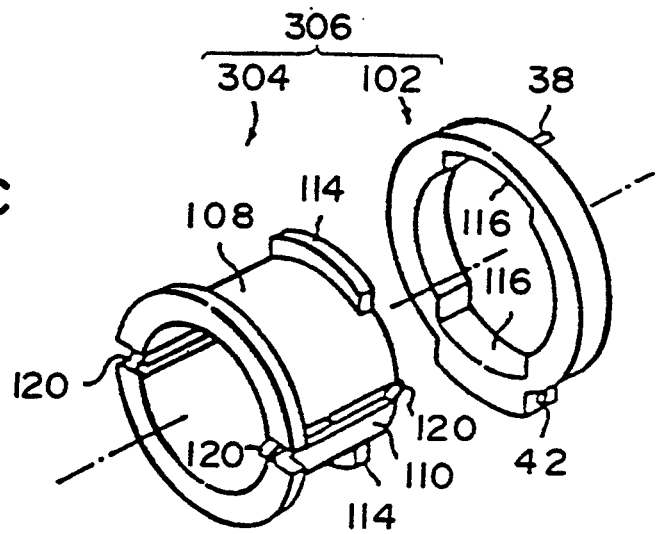
Figure 8D:
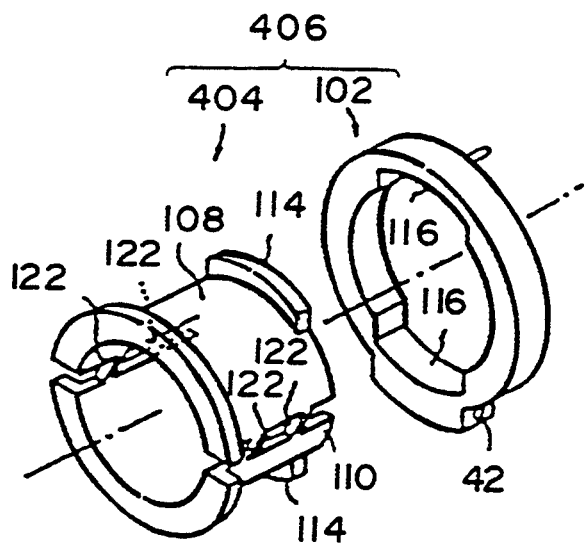
Figure 8E:
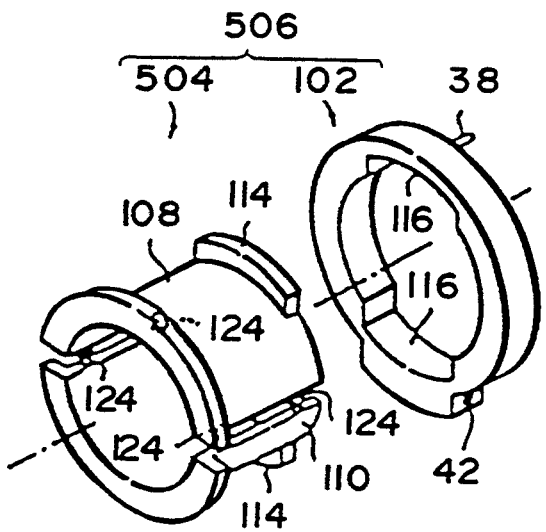

Furthermore, cylindrical portion 304 may be arranged as shown in FIG. 8C in which longitudinally opposite ends of the upper cylindrical portion 108 and the longitudinally opposite ends of the lower cylindrical portion 110 are connected together by substantially U-shaped modified portions 120 that are bent in such a manner as to project longitudinally outwardly of the cylindrical portion 304. Also, as shown in FIG. 8D, a longitudinally, substantially intermediate portion of the upper cylindrical portion 108 and a longitudinally, substantially intermediate portion of the lower cylindrical portion 110 may be connected together by four thin-walled portions inclined relative to the longitudinal direction. Furthermore, an arrangement may be provided as shown in FIG. 8E in which the upper cylindrical portion 108 and the lower cylindrical portion 110 are connected together by four compression coil springs 124. In these cases, when the intermediate portion 44C of the wire 44 is tightly wound around the cylindrical portions 104, 204, 304, 404, 504, respectively, the responsive rotating drums 106, 206, 306, 406, 506 can move toward the axis with the upper cylindrical portion 108 and the lower cylindrical portion 110 held substantially parallel with each other, and bite the angular portions 26A of the angular shaft 26 substantially uniformly. Hence, even a large torque can be transmitted by the rotating drums 106, 206, 306, 406, 506, respectively.

Figure 9:
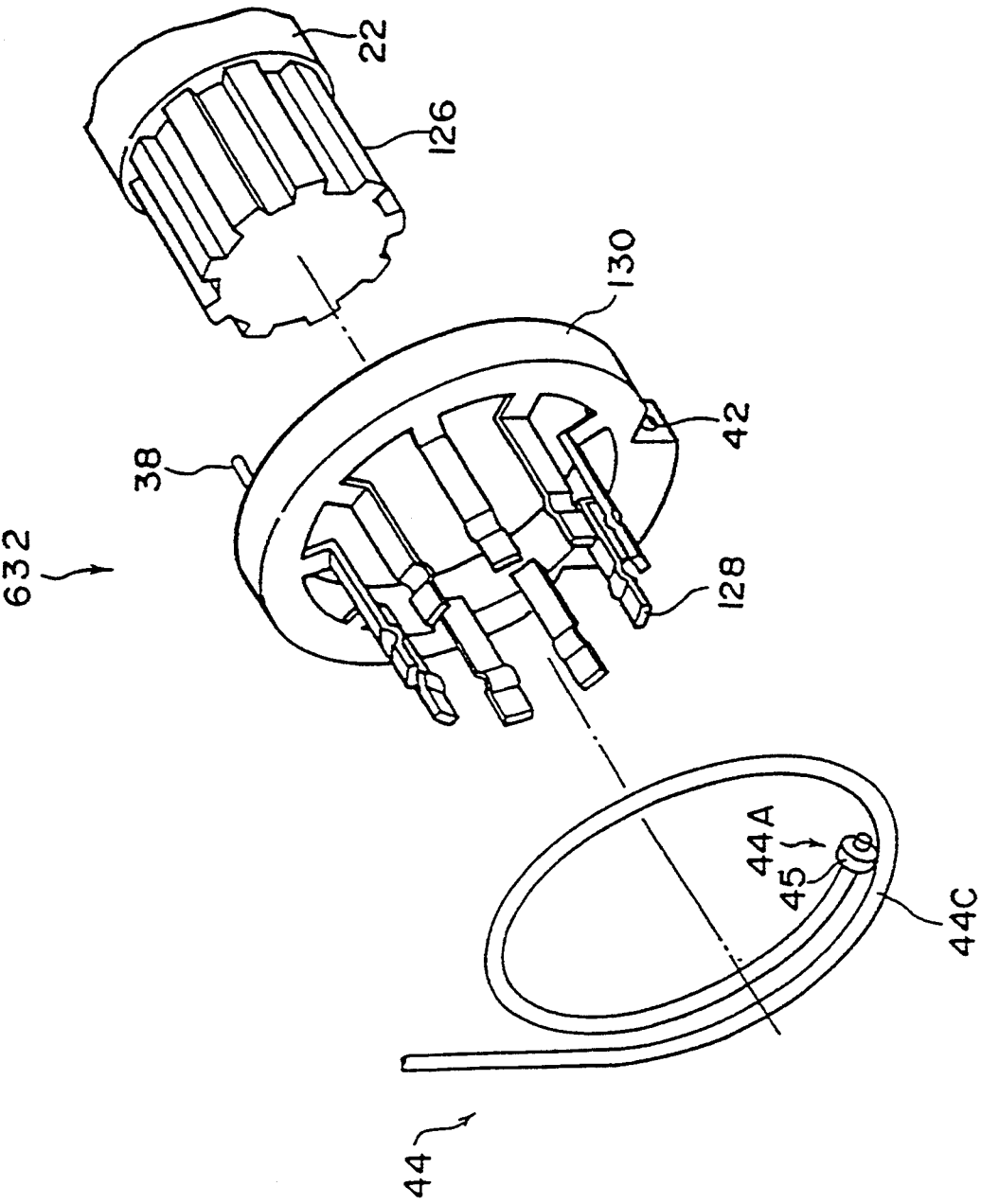
FIG. 9 is a perspective view of a rotating drum and a spline shaft in accordance with a sixth embodiment of the present invention.

In addition, as shown in FIG. 9 by way of a sixth embodiment, an arrangement may be provided such that, instead of the angular shaft 26, a spline shaft 126 is provided, and a rotating drum 632 in which deflectable portions, i.e., leg portions, 128 deformable toward the axis are provided on a support 130 in correspondence with the grooves in the spline shaft 126 is disposed in correspondence with the spline shaft 126. Each of the deflectable portions 128 has a longitudinally, substantially intermediate portion projecting toward the axis of the rotating drum 632 in a substantially U-shaped configuration, so as to be easily fitted into each groove in the spline shaft 126. In this case, when the wire 44 is tightly wound, the deflectable portions 128 are deformed toward the axis, and the wire 44 enters substantially U-shaped portions, thereby preventing the slippage of the wire 44 and allowing the deflectable portions 128, particularly the substantially U-shaped portions, to enter the grooves of the spline shaft 126. Consequently, the rotating drum 632 and the spline shaft 126 are made integral, thereby making it possible to rotate the takeup shaft 22 in the taking-up direction and reduce a load exerted by the wire 44 on the retaining hole 42.

As described above, the preloader in accordance with the present invention is capable of positively rotating the takeup shaft in the taking-up direction. As a result, the present invention offers an outstanding advantage in that the occupant-restraining webbing can be applied positively around the occupant with appropriate tightness.

What is claimed is:

1. A preloader for use in a webbing retractor for retracting an occupant-restraining webbing forcibly onto a takeup shaft at the time of a sudden deceleration of a vehicle, comprising:

a member to be engaged which rotates integrally with said takeup shaft;

an engaging member disposed around said member to be engaged and having a substantially smooth and deformable inner surface in spaced-apart relation therewith, and including a deformable portion; and actuating means connected to said engaging member and wound around said engaging member, said actuating means being adapted to be tightly wound around said engaging member at the time of the sudden deceleration of the vehicle so as to cause said engaging member to undergo deformation, thereby allowing said smooth inner surface of said engaging member to engage with said member to be engaged so that said member to be engaged bites into said smooth and deformable inner surface to rotate said member to be engaged together with said engaging member, so as to rotate said takeup shaft in a taking-up direction.

2. A preloader according to claim 1, wherein said member to be engaged is formed of a shaft member elongated in a direction of a rotational axis, and having an engagement portion for engagement with said engaging member at the time of the sudden deceleration of the vehicle provided on an outer surface of said shaft member.

3. A preloader according to claim 2, wherein an acute portion for biting said engaging member is provided on a tip of said engagement portion of said shaft member.

4. A preloader according to claim 1, wherein said engaging member is formed of a substantially tubular member, and said member to be engaged is disposed inside said tubular member.

5. A preloader according to claim 1, wherein at least one holding member holds said engaging member onto the webbing retractor, said holding member being designed to have such strength as will be overcome by the torque of said engaging member after said actuating means causes said engaging member to undergo deformation.

6. A preloader for use in a webbing retractor for retracting an occupant-restraining webbing forcibly onto a takeup shaft at the time of a sudden deceleration of a vehicle, comprising:

a shaft member to be engaged having an elongated configuration and adapted to rotate integrally with said takeup shaft, a rotational axis of said takeup shaft, being set as a longitudinal direction of said shaft member to be engaged, said shaft member having a portion to be engaged on an outer surface thereof;

a substantially tubular member disposed around said portion of said shaft member to be engaged and having a substantially smooth and deformable inner surface in spaced-apart relation therewith, and including a deformable portion; and actuating means connected to said tubular member and wound around said tubular member, said actuating means being adapted to be tightly wound around said tubular member at the time of the sudden deceleration of the vehicle so as to cause said tubular member to undergo deformation, thereby allowing said smooth inner surface of said tubular member to engage with said shaft member via said portion of said shaft member to be engaged to allow said portion to bite into said smooth and deformable inner surface of said tubular member to thereby rotate said shaft member together with said tubular member, so as to rotate said takeup shaft in a taking-up direction.

7. A preloader according to claim 6, wherein said shaft member has a square cross section across its axis of rotation, and each angular portion of said square cross section engages with the inner surface of said tubular member at the time of the sudden deceleration of the vehicle.

8. A preloader according to claim 6, wherein an acute portion for biting said smooth inner surface of said tubular member is provided at a tip of said portion to be engaged.

9. A preloader according to claim 6, wherein said shaft member includes a portion to be engaged in which a cross section orthogonal to the axial direction is a polygon with each apex formed into an acute angle.

10. A preloader according to claim 6, wherein said deformable portion is at least one thin-walled portion formed by cutting off a portion of an outer periphery of said tubular member in a tangential direction.

11. A preloader according to claim 10, wherein a pair of said thin-walled portions are provided in the outer peripheral surface of said tubular member at mutually opposing positions.

12. A preloader according to claim 6, wherein at least one shear pin holds said tubular member onto the webbing retractor, said shear pin being designed to have such shear strength as will be sheared by the torque of said tubular member after said actuating means causes said tubular member to undergo deformation.

* * * * *